United States Patent [19]

Jones

[11] Patent Number: 4,594,391
[45] Date of Patent: Jun. 10, 1986

[54] IMPACT-MODIFIED MONOVINYLIDENE AROMATIC POLYMER INJECTION MOLDING RESINS

[75] Inventor: Mary A. Jones, Midland, Mich.

[73] Assignee: The Dow Chemical Company, Midland, Mich.

[21] Appl. No.: 786,137

[22] Filed: Oct. 7, 1985

Related U.S. Application Data

[63] Continuation of Ser. No. 612,204, May 21, 1984, abandoned.

[51] Int. Cl.4 .................. C08F 279/00; C08F 279/02; C08F 279/04; C08F 2/14
[52] U.S. Cl. .................... 525/316; 525/211; 525/232; 525/233; 525/235; 525/238; 525/241; 525/903
[58] Field of Search ............... 525/211, 232, 233, 235, 525/238, 241, 903, 316

[56] References Cited

U.S. PATENT DOCUMENTS

| | | | |
|---|---|---|---|
| 3,624,182 | 11/1971 | Kubota | 264/211 |
| 3,859,268 | 1/1975 | Novack et al. | 526/65 |
| 3,903,202 | 9/1975 | Carter et al. | 525/316 |
| 3,976,725 | 8/1976 | Lee | 525/232 |
| 4,029,869 | 6/1977 | Ingram et al. | 526/233 |
| 4,096,205 | 6/1978 | Reith | 525/316 |
| 4,112,209 | 9/1978 | Gunsher et al. | 526/65 |
| 4,137,388 | 1/1979 | Cutter | 526/910 |
| 4,145,376 | 3/1979 | Bracke et al. | 525/99 |
| 4,161,573 | 7/1979 | Gunsher et al. | 526/65 |
| 4,187,260 | 2/1980 | Kruse et al. | 526/263 |
| 4,255,315 | 3/1981 | Anspon | 525/243 |
| 4,282,334 | 8/1981 | Walter et al. | 525/243 |
| 4,362,854 | 12/1982 | Prapas | 524/855 |

FOREIGN PATENT DOCUMENTS 55-164207 12/1980 Japan .

Primary Examiner—Herbert J. Lilling
Attorney, Agent, or Firm—Douglas N. Deline; Jonathan W. Morse

[57] ABSTRACT

Impact-modified monovinylidene aromatic polymer compositions are prepared having a specified broad molecular weight distribution. The resins prepared from these resins have been found to produce improved injection molded articles in that flow lines are reduced.

18 Claims, No Drawings

IMPACT-MODIFIED MONOVINYLIDENE AROMATIC POLYMER INJECTION MOLDING RESINS

CROSS-REFERENCE TO RELATED APPLICATION

This is a continuation of application Ser. No. 612,204 filed May 21, 1984, now abandoned.

BACKGROUND OF THE INVENTION

This invention relates to impact-modified monovinylidene aromatic polymer resin compositions having improved suitability for injection molding. In another aspect it relates to an injection molding process whereby injection molded articles having good combinations of physical properties and surface characteristics are obtained. In another aspect, it relates to improved injection molded articles having improved combinations of physical properties and surface characteristics.

In general, in the production of injection molded articles from an impact-modified monovinylidene aromatic resin it is necessary to have a resin having good processability, which resin, when molded into articles, produces articles which are strong, heat resistant and have a desirable surface appearance. Regarding surface appearance, particular difficulty has been encountered in developing impact-modified monovinylidene aromatic polymer resins which, when molded into articles, do not produce flow lines on the surface of the article. This problem has been particularly acute in the injection molding of complex parts such as television cabinets where there is a large surface area, sections of differing thickness and a number of rib sections presenting many channels to the flowing resins.

Kruse et al., in U.S. Pat. No. 4,187,260, teach that certain diperoxy-type initiators can be used to prepare impact-modified monovinylidene aromatic polymer compositions. It is maintained that such compositions produce molded articles having better surface characteristics. Kruse et al. teach that the molecular weight distribution which is produced using the diperoxy-type initiators results in reduced melt instability. Articles molded from the resins, therefore, have smooth, unfractured surfaces. Flow lines, however, do not result from melt instability or melt fracture and can still be a problem.

Cutter, in U.S. Pat. No. 4,137,388, discloses polystyrene resins, not reinforced by a rubber, having broad molecular weight distributions as does Japanese Patent Announcement Kokai No. 55/164,207.

It is an objective of the present invention to provide improved, impact-modified monovinylidene aromatic polymer resins. Desirably, these resins will have good melt flow properties and be able to be injection molded into articles having good combinations of physical properties and surface appearance. It would be very desirable if such resins would have a reduced tendency to produce flow lines when injection molded into articles, especially complex articles.

It is also an object of the present invention to provide an improved injection molding process whereby the flowlines otherwise visible on the surface of molded articles are eliminated or reduced. Another objective of the present invention is to provide improved injection molded articles wherein the flowlines are eliminated or reduced.

SUMMARY OF THE INVENTION

It has been found that an impact-modified monovinylidene aromatic polymer, wherein the monovinylidene aromatic polymer has a specific broad molecular weight distribution, can be readily injection molded into artices wherein the flowlines are reduced or eliminated. It has been found that the above objectives are achieved with an improved injection molding resin comprising monovinylidene aromatic polymer and a reinforcing amount of an impact improving polymer wherein the improvement comprises the monovinylidene aromatic polymer having (a) a weight average molecular weight (Mw) of from about 8.4 to 13.6 times the entanglement molecular weight of the monovinylidene aromatic polymer (EMW); (b) a ratio of Mw to Mn of greater than about 2.4; (c) less than about 10 percent by weight of the monovinylidene aromatic polymer molecules having molecular weights below about 1.3 times the entanglement molecular weight; and (d) about 34 to 42 percent by weight of the monovinylidene aromatic polymer molecules have molecular weights below about 5.2 times the EMW.

It has also been found that injection molding processes using such resins are improved and produce improved impact resistant, injection molded articles having reduced numbers of flowlines.

DETAILED DESCRIPTION OF THE INVENTION

The polymers to which the present invention is applicable include monovinylidene aromatic polymers. As used herein monovinylidene aromatic polymers are polymers comprising polymerized therein at least 50 weight percent based on polymer weight, preferably 90 and most preferably 100 weight percent, of one or more monomers of the formula:

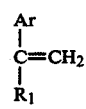

wherein $R_1$ is selected from the group of radicals consisting of hydrogen and alkyl radicals containing three carbons or less, and Ar is selected from the group of radicals consisting of phenyl, halo-phenyl, alkylphenyl and alkylhalophenyl. The present invention is particularly suited to polystyrene, poly para-vinyl toluene and copolymers of styrene with α-methyl styrene. Copolymers of styrene with other copolymerizable monomers such as acrylonitrile are also advantageously utilized according to the present invention.

According to the present invention, monovinylidene aromatic polymer resins which can be molded into articles having reduced flowlines are obtained when the polymer has an average molecular weight within a specified range, a limited amount of polymer molecules having molecular weights below certain minimum molecular weights and a specified ratio of Mw to Mn. It has been found that the required molecular weights can be expressed for a broad range of monovinylidene aromatic polymers in terms of a multiple of the entanglement molecular weight of the monovinylidene aromatic polymer of interest. The term "entanglement molecular weight" as used herein will be further discussed and defined below. Thus, it has been found that the above-described improved property combinations can be observed where the monovinylidene aromatic polymer meets certain requirements. First, the weight average molecular weight (Mw) must be about 8.4 to 13.6 times the entanglement molecular weight of the polymer. Second, less than about 10 percent by weight of the polymer molecules can have molecular weights below about 1.3 times the entanglement molecular weight of the polymer, and about 34 to 42 percent by weight of the polymer molecules can have molecular weights below about 5.2 times the entanglement molecular weight of the polymer. Third, the ratio of Mw to Mn is greater than 2.4. Preferably, resins are produced wherein the polymer has a Mw of about 9.9 to 13.1 times the entanglement molecular weight. It is also preferable that less than about 9 percent by weight of the polymer molecules have molecular weights below about 1.3 times the entanglement molecular weight and about 36 to 40 percent by weight of the polymer molecules have molecular weights below about 5.2 times the entanglement molecular weight. Preferably, the ratio of Mw to Mn is from about 3 to 3.4.

Techniques for determining the entanglement molecular weight of a polymer composition are known in the art, as are the entanglement molecular weights for many different polymer compositions. See, for example, Jan. 25, 1966, *Chemical Reviews*, Volume 66, No. 1, pages 1 through 25, for an article by Porter and Johnson giving a general overview of this theory. See also a May, 1981 report by Donald and Kramer entitled "Effect of Molecular Entanglements on Craze Microstructure in Glassy Polymers" identified as MSC Report No. 4407 and available at the Department of Materials Science and Engineering, Materials Science Center, Cornell University, Ithaca, N.Y. The technique for the determination of entanglement molecular weight used herein was described in a 1979 address by J. T. Seitz entitled "Measurements of Entanglement Length in Broad Molecular Weight Systems", presented at the 50th Golden Jubilee of the Rheology Society in Boston, Mass. In this technique, a sample of polymer is examined by dynamic mechanical analysis. This is conveniently done using a Mechanical Spectrometer manufactured by Rheometrics, Inc. Such analysis is done using a sample stretching frequency of 0.1 hertz and increasing the sample temperature at a rate of 1° C. per minute. In this way, the temperature and the storage modulus are found at the minimum point on the Tan $\delta$ curve (Tan $\delta_{min}$) after the temperature goes above the glass transition temperature of the sample. The following equation then can be used to calculate the entanglement molecular weight of that polymer composition.

Entanglement Molecular Weight =

$$\frac{\rho R T_{min}}{G_{min}'} [1 - 0.36(\text{Tan}\delta_{min})]^{1.25}$$

where
$\rho$ = density in grams per cubic centimeter at Tan $\delta_{min}$
R = gas constant
$T_{min}$ = temperature in degrees Kelvin at Tan $\delta_{min}$
$G_{min}'$ = storage modulus in dynes per square centimeter at Tan $\delta_{min}$.

This equation then gives the entanglement molecular weight for polymers. This technique or a technique which produces results consistent herewith should be used to determine entanglement molecular weights for the purpose of application of the present invention.

The entanglement molecular weight values for several polymers as determined by this technique are listed in Table I, below.

TABLE I

| Polymer | Entanglement Molecular Weight |
|---|---|
| Polystyrene | 19,100 |
| Random copolymer of styrene and α-methylstyrene (80/20) | 17,300 |
| Random copolymer of styrene and α-methylstyrene (50/50) | 12,600 |
| Random copolymer of styrene and acrylonitrile (64/36) | 11,600 |
| Poly para-vinyltoluene | 28,400 |
| Poly para-tertiarybutylstyrene | 43,400 |

The terms "weight, number and 'Z' average molecular weights" as used herein are well known in the art. As used herein, they are determined by gel permeation chromatography (GPC).

It is well known in the art to incorporate into brittle resins, such as monovinylidene aromatic polymer resins, amounts of impact-improving polymer (also called impact modifier) to prepare so-called rubber- or impact-modified monovinylidene aromatic polymer resins which are more resistant to breaking under a sudden impact than the same resin not containing the reinforcing polymer.

The reinforcing polymers suitable for use in the present invention are well known and include ethylene-propylene-terpolymer (EPDM) rubbers and polymers containing polymerized therein at least about 50 percent by weight of one or more conjugated diene monomer such as butadiene and/or isoprene, preferably at least about 60 percent by weight of the conjugated diene monomer. Such polymers preferably should have a glass transition temperature, as measured by ASTM D 3418-81, below about 0° C., preferably below about −20° C. and most preferably below about −40° C. Impact modifiers include polymers of greater than 50 weight percent butadiene, preferably greater than 60 weight precent. Where copolymers of conjugated diene monomers are used, the preferred comonomer is a monovinylidene aromatic monomer, preferably styrene.

In general, the amount of the reinforcing rubber polymer can vary depending on the properties desired to be achieved in the resultant resin. Typically, however, the impact-modified monovinylidene aromatic polymer composition will contain up to about 40 percent by weight impact improving polymer based on total resin weight, preferably about 5 to 30 percent by weight.

The present invention is particularly applicable to impact-modified polystyrene (also referred to as High Impact Polystyrene or HIPS) and can be readily illustrated with HIPS resins. It has been determined as described above that the entanglement molecular weight of polystyrene is about 19,100. Therefore, making the above-described calculations, polystyrene resins according to the present invention have an Mw of from about 160,000 to about 260,000, preferably from about 190,000 to about 250,000. The polystyrene according to the present invention is further characterized by the fact that less than about 10 percent by weight of the polymer molecules, preferably less than about 9 weight percent, have molecular weights below about 25,000 and about 34 to 42 percent by weight of the polymer molecules, preferably about 36 to 40 weight percent, have molecular weights below about 100,000. The molecular weight data for polystyrene discussed herein is determined by gel permeation chromatography (GPC). The GPC analysis in the present teachings can be done using a GPC column which is linear in the range of molecular weights of from about 600 to about 2,000,000.

It has been found to be critical to optimize the physical property combinations in the impact-modified resins according to the present invention to have the proper percent by weight of polystyrene molecules having molecular weights below about 25,000. It has been found desirable to keep this weight fraction below about 10 percent by weight of the polymer, preferably below about 9 percent by weight of the polymer. It has also been found critical in achieving optimized combinations of physical properties to control the precent by weight of polystyrene molecules having molecular weights less than about 100,000. Generally desirable physical properties can be achieved when this weight fraction is about 34 to 42 weight percent of the polymer, preferably 36 to 40 weight percent. It has been found that when these criteria are met the physical properties of the resultant polymer resin are quite satisfactory while the flowlines are reduced.

It has also been found desirable to control the amount of volatile material in the polymer compositions. Such volatile materials include residual solvent and monomer and also dimers and trimers. These materials desirably comprise less than 1.5 percent by weight of the impact-modified monovinylidene aromatic polymer compositions according to the present invention and preferably less than 1 percent by weight.

The high impact polystyrene resins produced according to the present invention are particularly suited for injection molding uses. For such uses, it has been found especially desirable if the resin compositions according to this invention, when compression molded, have a tensile strength at yield ($T_y$) of at least 3,300 pounds per square inch, a 30 to 40 percent elongation (% E), a melt flow rate of 4 to 6 grams per 10 minutes and a Vicat Heat Distortion temperature (VHD) of at least 216° F. It has been found that such resins according to the present invention can be used to prepare improved injection molded articles which have reduced flow lines.

The compositions according to the present invention can be prepared in a single process by modification of known polymerization processes for producing impact-modified monovinylidene aromatic polymers or by blending several separately prepared elements together.

It has been found preferable to prepare the compositions according to the present invention by dissolving the impact improving polymer in the monomer(s) and optional diluent and then subjecting the mixture to polymerization conditions and thereby polymerizing the monomer(s). The polymerization conditions need to be such that the monovinylidene aromatic polymer produced has the desired molecular weight and molecular weight distribution. Preferably the conditions are such that a relatively high molecular weight polymer is produced in the first reaction zone. This can be accomplished by known techniques such as lower temperature, longer residence time, lower concentration of solvents having a chain transfer effect, and the like. After production of the high molecular weight polymer, the reaction mixture can be exposed to conditions wherein a carefully controlled lower molecular weight polymer portion can be made. Such conditions can include higher temperature, higher initiator concentration, addition of a chain transfer agent and the like.

In the polymerization of polymers according to the present invention, the method for initiation is not critical as long as the necessary average molecular weights and molecular weight distributions are achieved. For example, the polymerization can be initiated and take place free radically or anionically. Suitable conditions for thermal free radical initiation as well as suitable radical and anionic initiator compositions are well known in the art. Representative free radical initiators include the peroxide initiators such as the peresters; e.g., tertiary butyl peroxybenzoate and tertiary butyl peroxyacetate; dibenzoyl peroxide, dilauryl peroxide; 1,1,-bis tertiary peroxy-3,3,5-trimethylcyclohexane; 1,1-bis-t-butylperoxycyclohexane, and di-cumyl peroxide. Representative anionic initiators include well known organo lithium initiators such as n-butyllithium.

The use of chain transfer agents has been found to be important to achieve the molecular weight distributions according to the present invention. The various chain transfer agents such as α-methylstyrene dimer and the mercaptans are well known in the art.

The present compositions may, of course, contain amounts of other commonly used additives such as, for example, fillers, stabilizers, pigments, and even plasticizers. In some cases, it may be desirable to modify the present compositions having as their base properties very good heat distortion temperatures combined with satisfactory melt flow rates and tensile strengths to produce so-called easy flow resins. In such cases, the addition of a plasticizer in amount up to about 10 percent by weight, preferably less than 2 percent by weight, can provide even better melt flow rates than found in other resins having similar levels of strength and heat resistance. In any event, the addition of little or no plasticizer is preferred and is not necessary to achieve melt flow rates equivalent to those of other resins while maintaining better strength and heat resistance than other resins of similar processability.

EXAMPLES

In the following examples various test techniques are used to determine the indicated values. The samples tested were compression molded at 390° F. The tensile strength, elongation and modulus are determined by ASTM D-638 Izod impact strength is determined by ASTM D-256. Vicat heat distortion temperature is determined by ASTM D-1525. The melt flow rate is determined by ASTM D-1238, condition G. The Gardner dart impact resistance is determined by ASTM D-3029G. The Gardner gloss is determined by ASTM D-523.

The surface uniformity is determined by preparing a divided tray having the dimensions 6.5 inches by 10 inches by 1.5 inches, with dividers forming the tray into 6 compartments. A Cincinnati Milicron brand injection molding machine is used having three heaters that heat the barrel to temperatures of 390° F., 400° F. and 410° F. at progressive points in the barrel. The mold is maintained at 90° C. The molding cycle consists of a 6 second injection time, 6 second hold time, 18 second cooling time, 0.1 second decompression time and 2 second clamp opening time. The injection pressure is 10,000 psi, the hold pressure is 5,500 psi and the back pressure is 100 psi. The screw speed is 134 rpm, the shot size is 3 inches and the cushion is 3/16 inch. A mold that had not been polished recently was used to aggravate the flow line problem. The molded trays were visually inspected and trays having more than 4 flow lines in three sections were rated bad, 3 or 4 flow lines in three sections were rated medium, 1 to 3 flow lines in two sections were rated good and no flow lines were rated excellent.

Example compositions are prepared using a reactor system divided into nine temperature zones, arranged in series and each about equal in volume. The reaction mixture flows through each zone in a plug-flow fashion with good agitation and mixing in the direction perpendicular to flow. A feed solution is prepared consisting of 85.7 percent by weight styrene monomer, 8 percent by weight ethyl benzene solvent, 5.8 percent by weight high cis content polybutadiene rubber, 0.25 percent by weight hindered phenolic antioxidant, 0.25 percent by weight mineral oil and 0.04 percent by weight 1,1-bis-t-butylperoxycyclohexane initiator. This feed solution is then divided into two portions, a main feed solution and a second feed solution. The main feed solution is heated to 65° C. and supplied to the first reactor zone. The nine reactor zones are at the following temperatures respectively: 100° C., 106° C., 115° C., 121° C., 126° C., 137° C., 143° C., 156° C. and 174° C. Polymerization occurs as the reaction mixture passes through the reactor zones. The reaction mixture is supplied to the first zone and removed from final zone at a rate sufficient to achieve a total residence time in the first three zones of about 2.1 hours. In the fifth reactor zone where the temperature is about 126° C. and where about 35 to 55 percent by weight of the monomer has been converted to polymer, a second portion of the same feed solution is added to the reaction mixture at a rate of about 25 percent of the main feed solution. A third feed stream consisting of 97.2 weight percent ethylbenzene and 2.8 weight percent n-dodecylmercaptan is added to the seventh reactor zone where the temperature is 143° C. and 51 to 52 percent by weight of the monomer has been converted to polymer. The reaction mixture removed from the ninth stage is devolatilized and the resin formed into pellets. The final product contained about 7.25 percent by weight rubber.

Various properties of the resin were measured and the results are shown in Table II below.

TABLE II

| | Molecular Weight Data |
|---|---|
| $M_w$ | 202,000 |
| $M_n$ | 71,200 |
| $M_z$ | 385,000 |
| $M_w/M_n$ | 2.84 |
| Wt % < 100,000[1] | 39.54 |
| Wt % < 25,000[2] | 7.65 |
| | Physical Property Data |
| Tensile Strength | |
| at yield (psi) | 3,340 |
| at rupture (psi) | 2,340 |
| Elongation | 24% |
| Modulus (psi) | 2.79 × 10$^5$ |
| Izod (ft lbs/inch notch) | 1.74 |
| Vicat Heat Distortion Temperature | 216.6° F. |
| Melt Flow Rate (g/10 min) | 4.86 |
| Gardner Dart Impact Resistance (inch lbs) | 76 |
| Gardner Gloss | 17% |
| Surface Uniformity | Good |

[1]Weight percent of polymer molecules having molecular weight less than 100,000.
[2]Weight percent of polymer molecules having molecular weight less than 25,000.

A second example composition is obtained by blending together typical impact-modified polystyrene resin (IPS) and amounts of general purpose polystyrene (GP PS) not containing rubber. These components have the average molecular weight and molecular weight distribution necessary to provide the proper average molecular weight and molecular weight distribution in the resultant blend. The molecular weight data and surface properties are reported below in Table III. The resultant composition also contained 10 percent by weight triblock copolymer of 70 percent butadiene and 30 percent styrene, 16 percent by weight ignition retarding additives, 1 percent by weight polyethylene and 0.10 percent by weight antioxidant.

TABLE III

| | Molecular Weight Data | | |
|---|---|---|---|
| | IPS | GP PS | Resultant Blend |
| Wt. % PS Contributed By Component[1] | 56 | 44 | 100 |
| $M_w$ | * | 196,000 | 195,000 |
| $M_n$ | * | 42,200 | 74,200 |
| $M_z$ | * | 435,000 | 366,000 |
| $M_w/M_n$ | * | 4.6 | 2.6 |
| Wt. % < 100,100[2] | * | 46.4 | 38.7 |
| Wt. % < 25,000[3] | * | 14.6 | 6.6 |

| | Physical Property Data Resultant Blend |
|---|---|
| Tensile Strength at Yield (psi) | 3,170 |
| Tensile Strength at Rupture (psi) | 2,370 |
| Elongation | 42% |
| Modulus (psi) | 2.96 × 10$^5$ |
| Izod (ft lbs/inch notch) | 1.23 |
| Vicat Heat Distortion Temperature | 216.3° F. |
| Melt Flow Rate (g/10 min) | 8.85 |
| Gardner Dart Impact Resistance (inch/lbs) | 24 |
| Gardner Gloss | 17% |
| Surface Uniformity | Excellent |

*Value not measured.
[1]Percent by weight of the polystyrene in the blend which is provided by the component.
[2]Weight percent of polymer molecules having molecular weight less than 100,000.
[3]Weight percent of polymer molecules having molecular weight less than 25,000.

Several compositions prepared generally as described above in Examples 1 and 2 are compared below in Table IV to illustrate the criticality of obtaining the proper molecular weight distribution.

TABLE IV

| Composition | Mw (× 10$^3$) | Mw/Mn | Wt % <100,00[1] | Wt % <25,000[2] | Elongation (%) |
|---|---|---|---|---|---|
| A | 199 | 2.9 | 40.1 | 7.9 | 31 |
| B | 202 | 2.8 | 39.5 | 7.6 | 24 |
| C | 203 | 3.2 | 40.6 | 9.8 | <20 |
| D | 203 | 3.1 | 39.9 | 8.6 | 39 |
| E | 210 | 3.2 | 39.7 | 9.1 | 32 |
| F | 217 | 3.2 | 38.5 | 8.1 | 27 |

[1]Weight percent polymer molecules having molecular weights less than 100,000.
[2]Weight percent polymer molecules having molecular weights less than 25,000.

As can be seen in Table IV above, good elongation values (above 20) are typically obtained in the compositions according to the invention.

While the present invention has been described with reference to particular embodiments and examples, it should be understood that such embodiments are not intended to limit the scope of the presently claimed invention.

What is claimed is:

1. An improved, impact-modified injection molding resin comprising monovinylidene aromatic polymer and a reinforcing amount of an impact improving polymer wherein the improvement comprises the monovinylidene aromatic polymer having (a) a weight average molecular weight (Mw) of from about 8.4 to 13.6 times the entanglement molecular weight of the monovinylidene aromatic polymer (EMW); (b) a ratio of Mw to number average molecular weight (Mn) greater than about 2.4; (c) less than about 10 percent by weight of the monovinylidene aromatic polymer molecules having molecular weights below about 1.3 times the entanglement molecular weight; and (d) about 34 to 42 percent by weight of the monovinylidene aromatic polymer molecules having molecular weights below about 5.2 times the EMW and further wherein the impact improving polymer is dissolved in the monomers used to prepare the monovinylidene aromatic polymer and the monomers are then polymerized in a continuous process.

2. A composition according to claim 1 wherein the monovinylidene aromatic polymer has a weight average molecular weight of from about 9.9 to about 13.1 times the EMW.

3. A composition according to claim 1 wherein the ratio of Mw and Mn is from about 3 to about 3.4.

4. A composition according to claim 1 wherein from about 36 to about 40 percent by weight of the monovinylidene aromatic polymer molecules have molecular weights below about 5.2 times the EMW.

5. A composition accoding to claim 4 wherein less than about 9 percent by weight of the monovinylidene aromatic polymer molecules have molecular weights below about 1.3 times the EMW.

6. A composition according to claim 1 wherein the monovinylidene aromatic polymer has an EMW of about 19,100.

7. A composition according to claim 1 wherein the monovinylidene aromatic polymer is polystyrene.

8. A composition according to claim 1 wherein the number of flow lines produced when the resin is injection molded is reduced as compared to a compositionally similar resin not having the specified molecular weight distribution which is injection molded under the same conditions.

9. An injection molding process using a resin according to claim 1.

10. An injection molded article prepared from a resin according to claim 1.

11. A polystyrene composition according to claim 1 wherein the polystyrene has (a) a weight average molecular weight of from about 160,000 to about 260,000; (b) a ratio of Mw to Mn of greater than 2.4; (c) less than about 10 percent by weight of the polystyrene molecules having a molecular weight below about 25,000; and (d) about 34 to 42 percent by weight of the polystyrene molecules having a molecular weight below about 100,000.

12. A polystyrene composition according to claim 11 wherein the polystyrene has a weight average molecular weight of from about 190,000 to about 250,000.

13. A polystyrene composition according to claim 12 wherein the polystyrene has a ratio of Mw to Mn of from about 3 to about 3.4.

14. A polystyrene resin according to claim 13 wherein from about 36 to about 40 percent by weight of the molecules have molecular weights below about 100,000.

15. A polystyrene resin according to claim 14 wherein less than about 9 percent by weight of the polystyrene molecules have molecular weights below about 25,000.

16. A resin composition according to claim 1 wherein the monovinylidene aromatic polymer is a copolymer of styrene and acrylonitrile.

17. A resin composition according to claim 1 wherein the monovinylidene aromatic polymer is a polymer of para-vinyltoluene.

18. A resin composition according to claim 1 wherein the monovinylidene aromatic polymer is a copolymer styrene and alpha-methylstyrene.

* * * * *

UNITED STATES PATENT AND TRADEMARK OFFICE
CERTIFICATE OF CORRECTION

PATENT NO. : 4,594,391
DATED : June 10, 1986
INVENTOR(S) : Mary A. Jones

It is certified that error appears in the above-identified patent and that said Letters Patent is hereby corrected as shown below:

At Column 2, line 9, "artices" should read --articles--.

At Column 3, line 58, "$\frac{pRT_{min}}{G_{min}}$" should read --$\frac{pRT_{min}}{G'_{min}}$--.

At Column 4, line 46, "precent" should read --percent--.

At Column 5, line 20, "precent" should read --percent--.

At Column 8, line 52 of Table IV, "$<100,00^1$" should read -- $100,000^1$ --.

At Column 9, line 27, "and" should read --to--.

At Column 9, line 32, "accoding" should read --according--.

Signed and Sealed this

Seventh Day of April, 1987

*Attest:*

DONALD J. QUIGG

*Attesting Officer*

*Commissioner of Patents and Trademarks*